United States Patent [19]
Shtipelman et al.

[11] Patent Number: 5,774,448
[45] Date of Patent: Jun. 30, 1998

[54] AIR SANDWICHED OPTICAL DISCS WITH CLOSABLE PRESSURE RELIEF HOLES

[75] Inventors: Boris A. Shtipelman, Rochester; James A. Barnard, Scottsville, both of N.Y.

[73] Assignee: Eastman Kodak Company, Rochester, N.Y.

[21] Appl. No.: 756,197

[22] Filed: Nov. 22, 1996

[51] Int. Cl.$^6$ .............................. G11B 7/24; G11B 33/14
[52] U.S. Cl. ........................................... 369/291; 369/283
[58] Field of Search ..................... 369/291, 271, 369/284, 287, 111, 270, 261, 283, 94, 286

[56] References Cited

U.S. PATENT DOCUMENTS

| | | | |
|---|---|---|---|
| 4,447,899 | 5/1984 | Geyer | 369/111 |
| 4,507,774 | 3/1985 | Marchant | 369/271 |
| 4,539,573 | 9/1985 | Marchant | 346/137 |
| 4,972,404 | 11/1990 | Yamaguchi | 369/284 |

Primary Examiner—John H. Wolff
Assistant Examiner—Kenneth Fields
Attorney, Agent, or Firm—Raymond L. Owens

[57] ABSTRACT

An optical disc is disclosed having a substrate in which data can be written on or read from, such optical disc being adapted to be inserted and clamped onto a spindle in a disc drive and having a transparent cover sheet disposed over the substrate surface. The cover sheet is held at inner and outer radii so that it is positioned to have a desired spacing from the substrate to prevent contaminants from passing to the substrate surface. A plurality of air passages are formed in the optical disc to prevent the transparent cover sheet from deflecting due to pressure differences between the outside atmosphere and the air in the space between the substrate surface and the transparent cover sheet.

7 Claims, 4 Drawing Sheets

AIR SANDWICHED OPTICAL DISCS WITH CLOSABLE PRESSURE RELIEF HOLES

CROSS REFERENCE TO RELATED APPLICATIONS

The present invention is related to U.S. Patent Application Ser. No. 08/755,747, entitled "Optical Discs With Cover Sheets and Pressure Equalization of the Enclosed Air", filed concurrently herewith, and U.S. Patent Application Ser. No. 08/755,085, entitled "Optical Discs with Cover Sheets and Dynamic Pressure Stabilization of the Enclosed Air", filed concurrently herewith, assigned to the assignee of the present invention. The disclosure of these related applications is incorporated herein by reference.

FIELD OF THE INVENTION

This invention relates to optical discs with enclosed substrates protected by a layer of air with closable pressure relief holes.

BACKGROUND OF THE INVENTION

As with all information storage devices, the recording surface of an optical disc must be protected from dust, small particles, or any other source of contamination. Since optical drives use removable media, such a protection is usually incorporated in the disc design. For instance, the widely used compact discs of various formats incorporate a layer of transparent plastic to separate the recording surface from the outside world. Such a surface in a 355.6mm in diameter optical disc is protected by a polycarbonate transparent cover sheet. The latter is radially tensioned and sealed to a spacer and a perimeter ring at the inner and outer radii of the disc, respectively. The space under the cover sheet is filled with air enclosed there during assembly of the disc. Obviously, the barometric pressure of air under the cover sheet (equal to the air pressure in the clean room during assembly) and the atmospheric pressure of air surrounding the disc during drive operation may have different values. This will create a pressure differential for the air inside and outside the disc resulting in deflection of the cover sheet.

Due to centrifugal forces during disc rotation, the air under the cover sheet will be displaced toward the outside periphery of the disc. This air motion will result in additional deflection of the cover sheet. Its original surface will be transformed into a more complicated shape that may result in catastrophic conditions when the cover sheet touches the objective lens (at the outer radius) or the substrate (at the inner radius). For examples of optical discs with cover sheets, see commonly assigned U.S. Pat. Nos. 4,507,774 and 4,539,573.

Referring to FIGS. 1 and 2, a prior art two-sided optical disc has a substrate 10 which is protected from the outside environment by transparent cover sheets 20 and 30. The disc is provided with a central opening 70. Each sheet is radially tensioned and sealed to spacers 40 or 50 and to a perimeter ring 60 at the inner and outer radii of the disc, respectively. Since the spacer thicknesses are larger than the height of the ring, the space under the cover sheet represents a frustum of a cone. Its volume is filled with air enclosed there during assembly of the disc.

As stated above, the barometric pressure of air under the cover sheet (equal to the air pressure in the clean room during assembly) and air surrounding the disc during drive operation may have different values. This will create some pressure differential for the air inside and outside the disc that will result in deflection of the cover sheet. Several graphs are shown in FIG. 3 illustrating the deformed cover sheet when the optical disc is placed at different altitudes. With increased altitudes above the sea level, the air pressure in the surrounding atmosphere is decreasing resulting in the cover sheet bulging. In such conditions, when the disc is used in the drive, the cover sheet may touch the objective lens of the optical head making reading or writing impossible. Similarly, at decreasing altitudes below the sea level, the air pressure of the surrounding atmosphere is increasing that deflects the cover sheet toward the substrate. If at high levels of pressure differentials the cover sheet touches the substrate, reading or writing becomes once again impossible. To avoid such catastrophic cases, the cover sheet deflection due to pressure differentials must be reduced or eliminated completely.

SUMMARY OF THE INVENTION

It is an object of the present invention to provide pressure equalization of enclosed air in optical discs with cover sheets.

This object is achieved in an optical disc having a substrate in which data can be written on or read from, such optical disc being adapted to be inserted and clamped onto a spindle in a disc drive and having a transparent cover sheet disposed over the substrate surface, comprising:

a) means for holding the cover sheet at spaced inner and outer radii so that it is positioned to have a desired spacing from the substrate to prevent contaminants from passing to the substrate surface;

b) means for preventing the transparent cover sheet from deflecting due to pressure differences between the outside atmosphere and the air in the space between the substrate surface and the transparent cover sheet, including:

i) means defining a plurality of passages near the center of the optical disc which provide communication between the atmosphere and the space between the transparent cover sheet and the substrate surface and located so that they can be closed when the optical disc is inserted and clamped onto a spindle of a disc drive to close the passages to prevent further communication between the outside atmosphere and the space between the substrate surface and the transparent cover sheet.

Advantages

It is an advantage of the present invention in optical discs protected by cover sheets for decreasing ballooning and deflection of this sheet while the disc is used at different altitudes where atmospheric pressure is changing without contaminating the space between the sheet and the disc surface. The provision of passages in the spacer provides pressure equalization. These passages are readily closed during disc rotation so additional air will not be drawn into the space between the substrate surface and the cover sheet.

The present invention creates a condition when the pressure differential for the air inside and outside the disc is substantially decreased or eliminated completely.

DETAILED DESCRIPTION OF THE INVENTION

Figure 1:
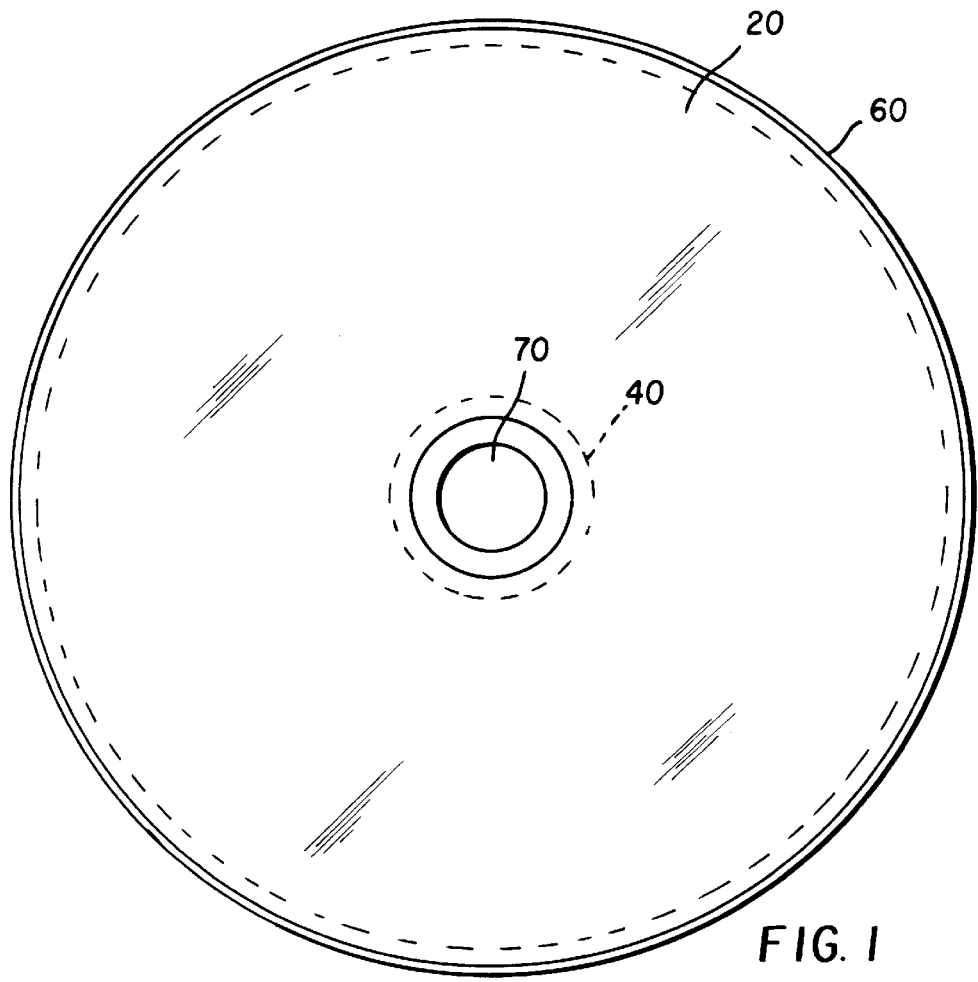
FIG. 1 is a top view of a prior art optical disc equipped with a cover sheet.
Figure 2:
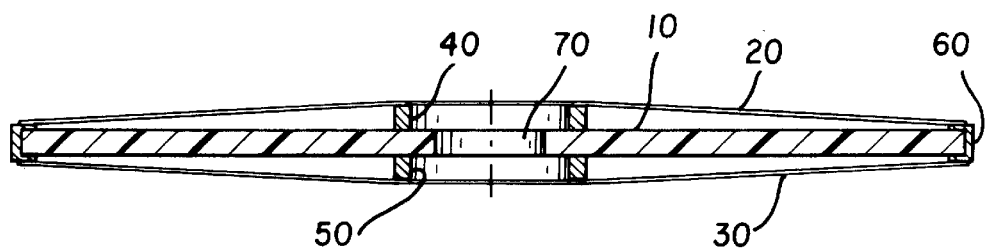
FIG. 2 is a radial cross section of the optical disc of FIG. 1.
Figure 3:
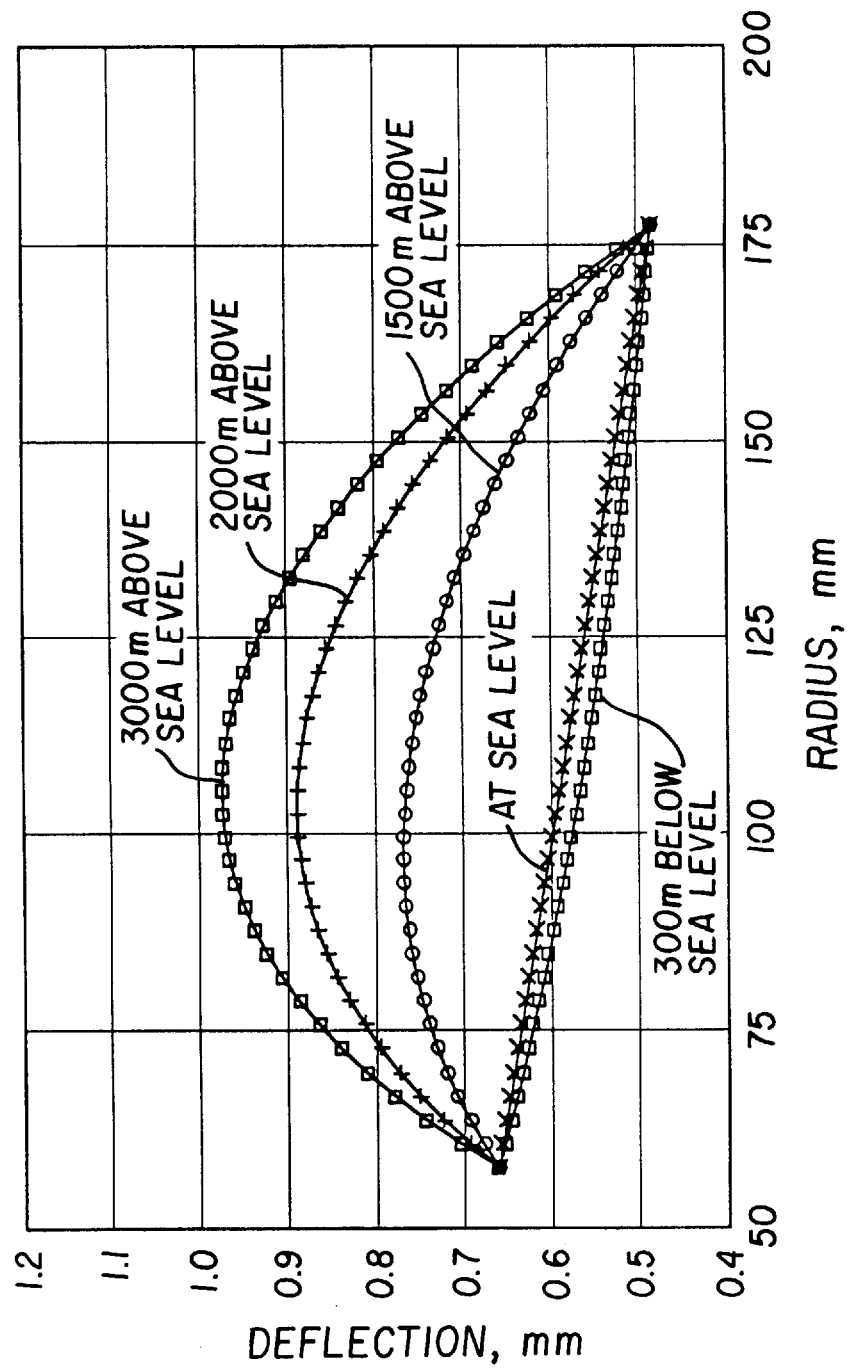
FIG. 3 is a plot of deflection vs. radius for the cover sheet of FIG. 1 showing deflection for the disc placed at different altitudes with changing air pressure of the surrounding atmosphere.

The present invention is described with reference to FIGS. 4–7, where parts correspond to those in FIGS. 1 and 2, with the same reference numbers being used. The present invention eliminates pressure differential for the air inside and outside the disc by providing a plurality of "breathing" passages in the area around the center hole 70 of the disc permitting the air to flow between the spaces above and below the cover sheet. It should be noted, however, that rotation of the disc in the drive results in centrifugal forces which will displace the air under the cover sheet toward the outside periphery of the disc. Therefore, if the "breathing" passages are left open to the surrounding atmosphere at all time, an air pumping effect will be created with the outside air constantly drawn inside the disc until the cover sheet erupts due to constantly increasing deflections. To avoid such an effect after the air pressure inside and outside the disc is statically equalized, these passages must be closed during disc rotation. An embodiment which provides all of these features is shown in FIGS. 4–7.

Figure 4:
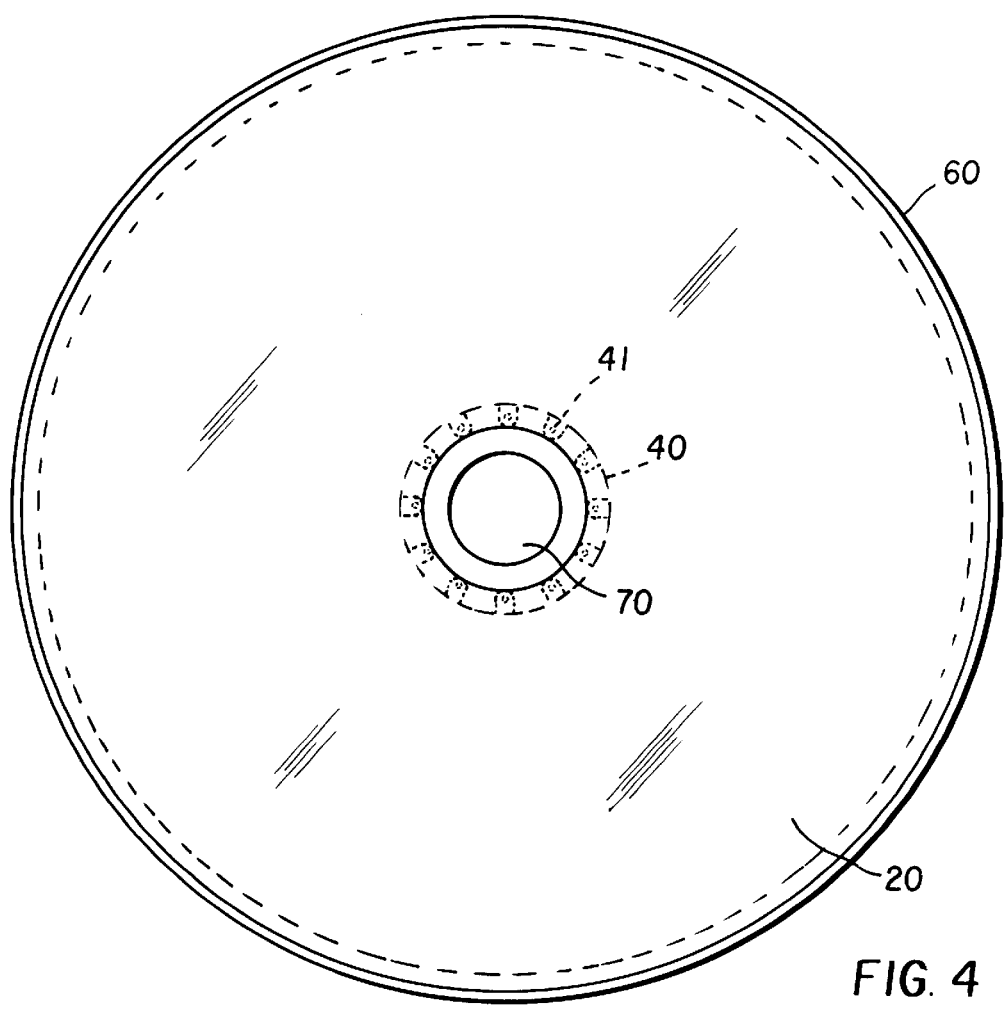
FIG. 4 is a top view of an optical disc in accordance with the present invention and having a plurality of passages near the central hole of the disc.
Figure 5:
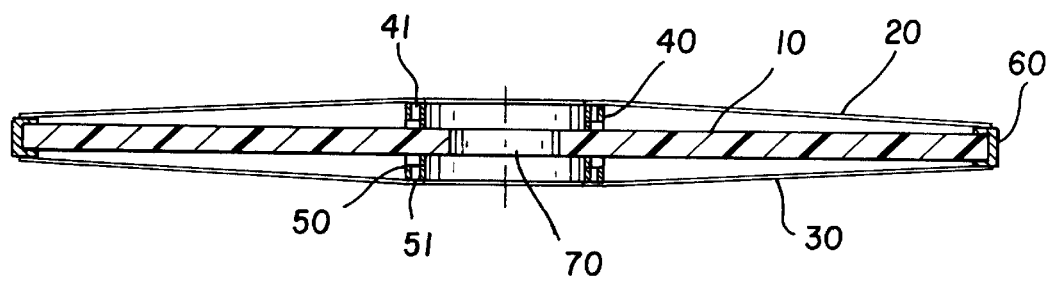
FIG. 5 is a radial cross section of the optical disc of FIG. 4.
Figure 6:
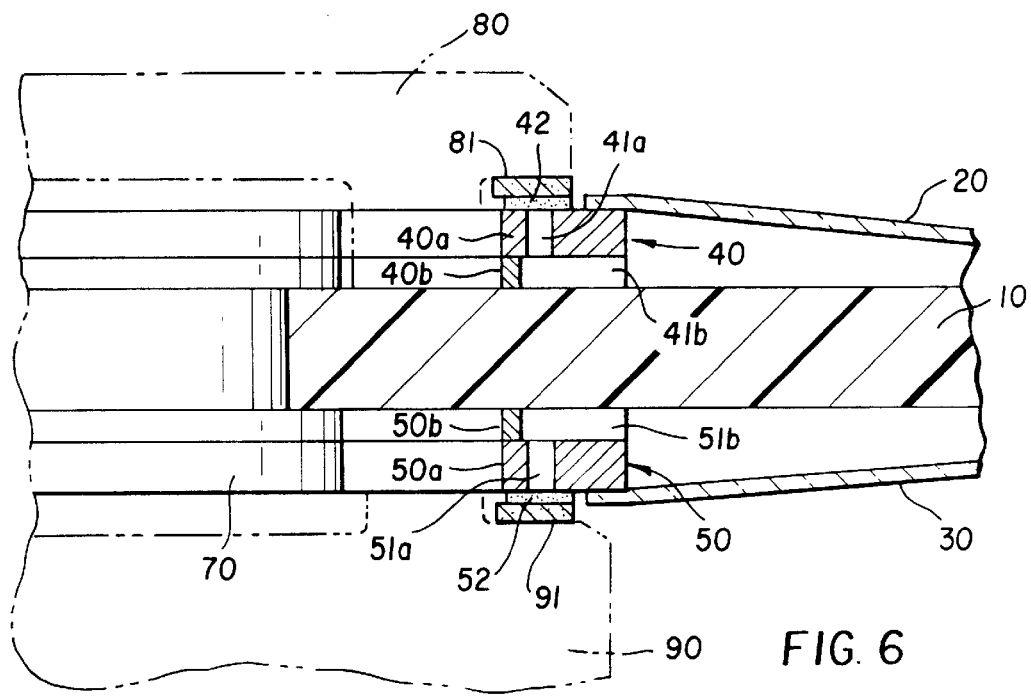
FIG. 6 is an enlarged view of a portion of the optical disc shown in FIG. 5.
Figure 7:
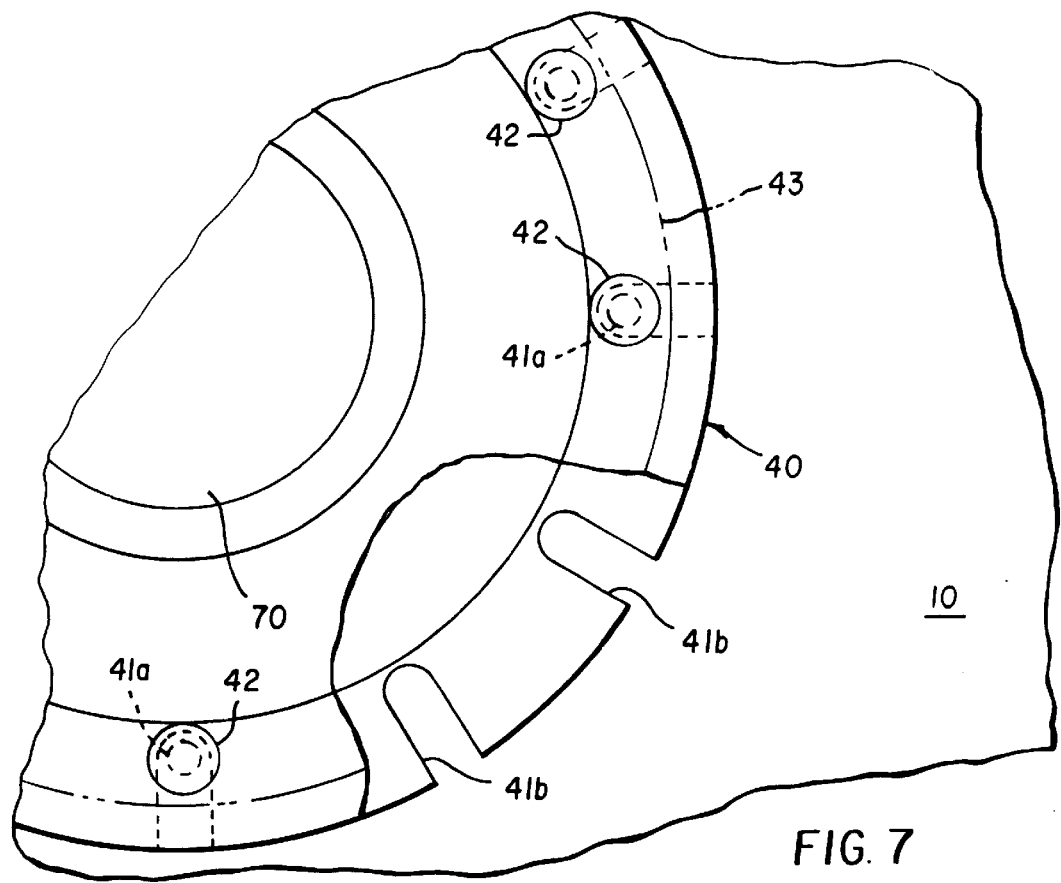
FIG. 7 is a partial top view of the portion of optical disc shown in FIG. 6.

Turning now to FIGS. 4 and 5, a plurality of "breathing" air passages 41 located around the center hole 70 of the disc are provided in a top spacer 40. Similar passages 51 are provided in a bottom spacer 50 as illustrated in FIG. 5. The same passages 41 and 51 in both spacers are shown in more detail in FIG. 6 which depicts a cross sectional portion of the disc shown in FIG. 4. As shown, the top spacer 40 is made of two elements 40a and 40b with holes 41a provided in element 40a and cutouts 41b provided in element 40b. This spacer 40 with both elements 40a and 40b can be manufactured as a singular part by injection molding. With the cover sheet 20 sealed to spacer 40 along a position shown by a circular trace 43 (see FIG. 7), air passages formed by holes 41a and cutouts 41b connect the space under the cover sheet 20 with the atmosphere surrounding the disc. This permits an air passage either from the outside into the inside areas of the disc or in the opposite direction, depending upon the differential pressure in those two spaces. To protect one of the recording surfaces of the disc from any outside contamination, the "breathing" air passages are covered with separate filters 42. However, a continuous ring of filtering material can also be used to provide the filters 42. In a similar fashion, as shown in FIG. 6, a bottom spacer 50 is formed of two elements 50a and 50b and includes air passages 51a and 51b. Filters 52 are also provided. After the air pressure inside and outside the disc is statically equalized, the "breathing" air passages 41 and 51 should be closed before the rotation of the disc starts. This action is executed by elastic elements 81, shown in FIG. 6, in a disc clamping cup 80 (for air passages 41a and 41b) and corresponding elastic elements 91 in the supporting surface of the drive spindle 90 (for air passages 51a and 51b).

The invention has been described in details with particular reference to preferred embodiments thereof, but it will be understood that variations and modifications can be effected within the spirit and scope of the invention. For example, some optical discs actually have two transparent substrates separated by an air sandwich. In this case, the substrate is enclosed not by a cover sheet, but by another substrate. The present invention is equally applicable to such structures.

Parts List 10 substrate
20 transparent cover sheet
30 transparent cover sheet
40 top spacer
40a element
40b element
41 air passages
41a holes
41b cutouts
42 filters
43 circular trace
50 bottom spacer
50a element
50b element
51 air passages
51a holes
51b cutouts
52 filters
60 perimeter ring
70 center hole
80 disc clamping cup
81 elastic elements
90 drive spindle
91 elastic elements

We claim:

1. An optical disc having a substrate in which data can be written on or read from, such optical disc being adapted to be inserted and clamped onto a spindle in a disc drive and having a transparent cover sheet disposed over the substrate surface, comprising:

a) means for holding the cover sheet at spaced inner and outer radii so that it is positioned to have a desired spacing from the substrate to prevent contaminants from passing to the substrate surface;

b) means for preventing the transparent cover sheet from deflecting due to pressure differences between the outside atmosphere and the air in the space between the substrate surface and the transparent cover sheet, including:

i) means defining a plurality of passages substantially close to the center of the optical disc which provide communication between the atmosphere and the space between the transparent cover sheet and the substrate surface and located so that they are closed when the optical disc is inserted and clamped onto the spindle of a disc drive to close the passages to prevent further communication between the outside atmosphere and the space between the substrate surface and the transparent cover sheet.

2. An optical disc having a substrate in which data can be written on or read from, such optical disc being clamped when inserted onto a spindle in a disc drive and having a transparent cover sheet disposed over the substrate surface, comprising:

a) such optical disc having a perimeter ring on the edge thereof and a spacer formed about a central opening in the disc;

b) a transparent cover sheet connected to the spacer and the perimeter ring and spaced from the substrate surface;

c) means for preventing the transparent cover sheet from deflecting due to pressure differences between the outside atmosphere and the air in the space between the substrate surface and the transparent cover sheet comprising such spacer being provided with a plurality of air passages leading from the outside atmosphere to the space between the transparent cover sheet and the substrate surface for equalizing the pressure in the space between the transparent cover sheet and the substrate surface and the outside atmosphere and being arranged so that such passages are adapted to be closed after the optical disc has been inserted into the drive.

3. The optical disc of claim 2 further including filtering means provided over the air passages to prevent contaminants from the atmosphere from entering into the space between the transparent cover sheet and the substrate surface.

4. An optical disc as set forth in claim 3 further including actuable means for closing the air passages to prevent air from passing between the space between the transparent cover sheet and the substrate surface and the outside atmosphere.

5. An optical disc having a substrate in which data can be written on or read from, such optical disc being clamped when inserted onto a spindle in a disc drive and having a transparent cover sheet disposed over the substrate surface, comprising:

a) such optical disc having a perimeter ring on the inner edge of the optical disc thereof and a spacer formed about a central opening in the disc;

b) a transparent cover sheet which is connected to the spacer and the perimeter ring and spaced from the substrate surface;

c) means for preventing the transparent cover sheet from deflecting due to pressure differences between the outside atmosphere and the air in the space between the substrate surface and the transparent cover sheet comprising a plurality of air passages leading from the outside atmosphere to the space between the transparent cover sheet and the substrate surface for equalizing the pressure in the space between the transparent cover sheet and the substrate surface and the outside atmosphere and being arranged so that such passages are adapted to be closed after the optical disc has been inserted into the optical drive;

d) filtering means provided over the passages to prevent contaminants from the atmosphere from entering into the space between the transparent cover sheet and the substrate surface; and e) actuable means for closing the passages to prevent air from passing between the space between the transparent cover sheet and the substrate surface and the outside atmosphere.

6. An optical disc having an enclosed substrate in which data can be written on or read from, such optical disc being adapted to be inserted and clamped onto a spindle in a disc drive and providing an air space between the substrate and an enclosing structure, the improvement comprising:

a) means defining a plurality of passages near the center of the optical disc which provide communication between the outside atmosphere and the air space and located so that they are closed when the optical disc is inserted and clamped onto a spindle of a disc drive to close the passages to prevent further communication between the atmosphere and the air space.

7. An optical disc having an enclosed substrate in which data can be written on or read from, such optical disc being adapted to be inserted and clamped onto a spindle in a disc drive and providing an air space between the substrate and an enclosing structure, the improvement comprising:

a) means defining a plurality of passages near the center of the optical disc which provide communication between the outside atmosphere and the air space and located so that they are closed when the optical disc is inserted and clamped onto a spindle of a disc drive to close the passages to prevent further communication between the atmosphere and the air space;

b) filtering means provided over the passages to prevent contaminants from the atmosphere from entering into the air space; and c) actuable means for closing the passages to prevent air from passing between the air space and the outside atmosphere.

* * * * *